(12) United States Patent
Streit

(10) Patent No.: US 12,536,411 B1
(45) Date of Patent: Jan. 27, 2026

(54) AI-ENHANCED ENTROPY MEASUREMENT SYSTEM FOR RANDOMNESS EVALUATION

(71) Applicant: ENTROKEY LABS INC., Cheyenne, WY (US)

(72) Inventor: Scott Streit, Cheyenne, WY (US)

(73) Assignee: Entrokey Labs Inc., Cheyenne, WY (US)

( * ) Notice: Subject to any disclaimer, the term of this patent is extended or adjusted under 35 U.S.C. 154(b) by 0 days.

(21) Appl. No.: 19/087,062

(22) Filed: Mar. 21, 2025

(51) Int. Cl.
*G06N 3/0464* (2023.01)
*G06N 3/048* (2023.01)
*G06N 3/09* (2023.01)
*H04L 9/08* (2006.01)

(52) U.S. Cl.
CPC ............ *G06N 3/0464* (2023.01); *G06N 3/048* (2023.01); *G06N 3/09* (2023.01); *H04L 9/0819* (2013.01); *H04L 9/0891* (2013.01)

(58) Field of Classification Search
CPC ........ G06N 3/0464; G06N 3/048; G06N 3/09; H04L 9/0819; H04L 9/0891
See application file for complete search history.

(56) References Cited

PUBLICATIONS

Blanco-Romero et al., "Machine Learning Predictors for Min-Entropy Estimation", Feb. 2, 2025, Entropy 2025, 27, 156, pp. 1-31. (Year: 2025).*

Zhu et al., "On the Analysis and Improvement of Min-Entropy Estimation on Time-Varying Data", Oct. 16, 2019, IEEE Transactions on Information Forensics and Security, vol. 15, pp. 1696-1708. (Year: 2019).*

Kim et al., "Quantum intrusion detection system using outlier analysis", Nov. 7, 2024, Scientific Reports vol. 14, Article No. 27114, pp. 1-12. (Year: 2024).*

Yang et al., "Neural Network Based Min-entropy Estimation for Random No. Generators", Dec. 29, 2018, Security and Privacy in Communication Networks. SecureComm 2018. Lecture Notes of the Institute for Computer Sciences, Social Informatics and Telecommunications Engineering, vol. 255, pp. 231-250. (Year: 2018).*

* cited by examiner

*Primary Examiner* — Brent Johnston Hoover
(74) *Attorney, Agent, or Firm* — Sheppard Mullin Richter & Hampton LLP

(57) ABSTRACT

A method and system for estimating the entropy of bit sequences using a hybrid deep learning model. The system employs a neural network model that integrates statistical and pattern-based analysis to assess entropy. A min-entropy estimation function determines randomness levels, while a convolutional neural network (CNN) extracts sequential patterns. The system leverages a structured training approach with configurable parameters, allowing for adaptive entropy estimation across various applications, including cryptographic security and anomaly detection.

15 Claims, 4 Drawing Sheets

AI-ENHANCED ENTROPY MEASUREMENT SYSTEM FOR RANDOMNESS EVALUATION

TECHNICAL FIELD

The present disclosure relates to systems and methods for measuring entropy in bit sequences. More specifically, it pertains to a novel approach that integrates statistical analysis and Convolutional Neural Networks (CNNs) to evaluate randomness in binary sequences across varying bit lengths. The disclosed system is particularly useful for cryptographic applications, including evaluating key strength and resistance to quantum computing-based attacks.

BACKGROUND

Entropy measurement is a critical aspect of cryptographic security, ensuring that generated keys and random sequences possess the necessary unpredictability to resist attacks. Traditionally, entropy is assessed using statistical methods that analyze bit distributions, pattern repetitions, and probability distributions. The National Institute of Standards and Technology (NIST) has developed widely used entropy measurement algorithms. However, NIST entropy algorithms require excessively large bit sequences-often up to 1 million bits-to produce accurate results. These methods struggle with shorter bit sequences (e.g., 4096-bit keys) and provide entropy scores within a narrow range (e.g., 0.86 to 0.94), limiting their accuracy in real-world security applications.

Existing AI-based approaches, such as Generative Adversarial Networks (GANs), are limited to evaluating sequences generated within their own framework and cannot assess externally produced bit sequences. Therefore, there is a need for solutions to evaluate entropy across bit sequences of varying lengths.

SUMMARY

The present disclosure provides systems and methods for preprocessing and analyzing bit sequences to extract statistical and pattern-based features and generate a randomness score that quantifies the unpredictability of a sequence. Unlike traditional entropy estimation techniques that rely solely on statistical randomness metrics, the disclosed system integrates Convolutional Neural Networks (CNNs) with statistical analysis to improve the accuracy and scalability of randomness evaluation, making it particularly valuable for cryptographic key validation, secure communications, and post-quantum security applications.

Various features and functionalities can be provided for feature extraction, randomness evaluation, and cryptographic key validation. In one aspect of the disclosure, a computer-implemented method may include receiving an input bit sequence, which may be a cryptographic key or any other binary sequence requiring randomness assessment. The input sequence is preprocessed by converting it into a standardized bit sequence format, ensuring compatibility with the system's randomness estimation framework.

The system extracts statistical randomness features, such as bit frequency distributions, run-length analysis, Shannon entropy, and min-entropy calculations, to quantify the structural properties of the sequence. Additionally, CNN-based pattern recognition detects hidden periodic structures, clustering effects, and anomalies indicative of low randomness. The statistical and CNN-extracted features are then combined using a fusion model to form a combined feature representation that improves the final randomness estimation.

The extracted feature representation is processed by a Fully Connected Neural Network (FCNN), which generates a normalized randomness score ranging from 0 to 1. This randomness score reflects the degree of unpredictability in the bit sequence, where 0 represents fully structured (low-randomness) sequences, and 1 represents highly unpredictable (random) sequences. The system ensures that randomness evaluation is not constrained by sample size limitations, allowing it to operate effectively on sequences of varying lengths, from 256-bit cryptographic keys to large-scale binary datasets.

Implementations of the disclosed technology may include one or more of the following features. In one embodiment, the disclosed system provides a standalone randomness calculator utility, which allows users to analyze and validate the randomness of bit sequences in real-time. The randomness calculator utility applies pretrained deep learning models to generate an accurate randomness score, making it applicable for cryptographic key validation, blockchain security, and entropy assessment in secure computing environments. By integrating AI-driven pattern recognition with statistical randomness metrics, the disclosed system provides a scalable, efficient, and robust solution for randomness estimation, ensuring that cryptographic keys meet high-randomness thresholds resistant to quantum attacks.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
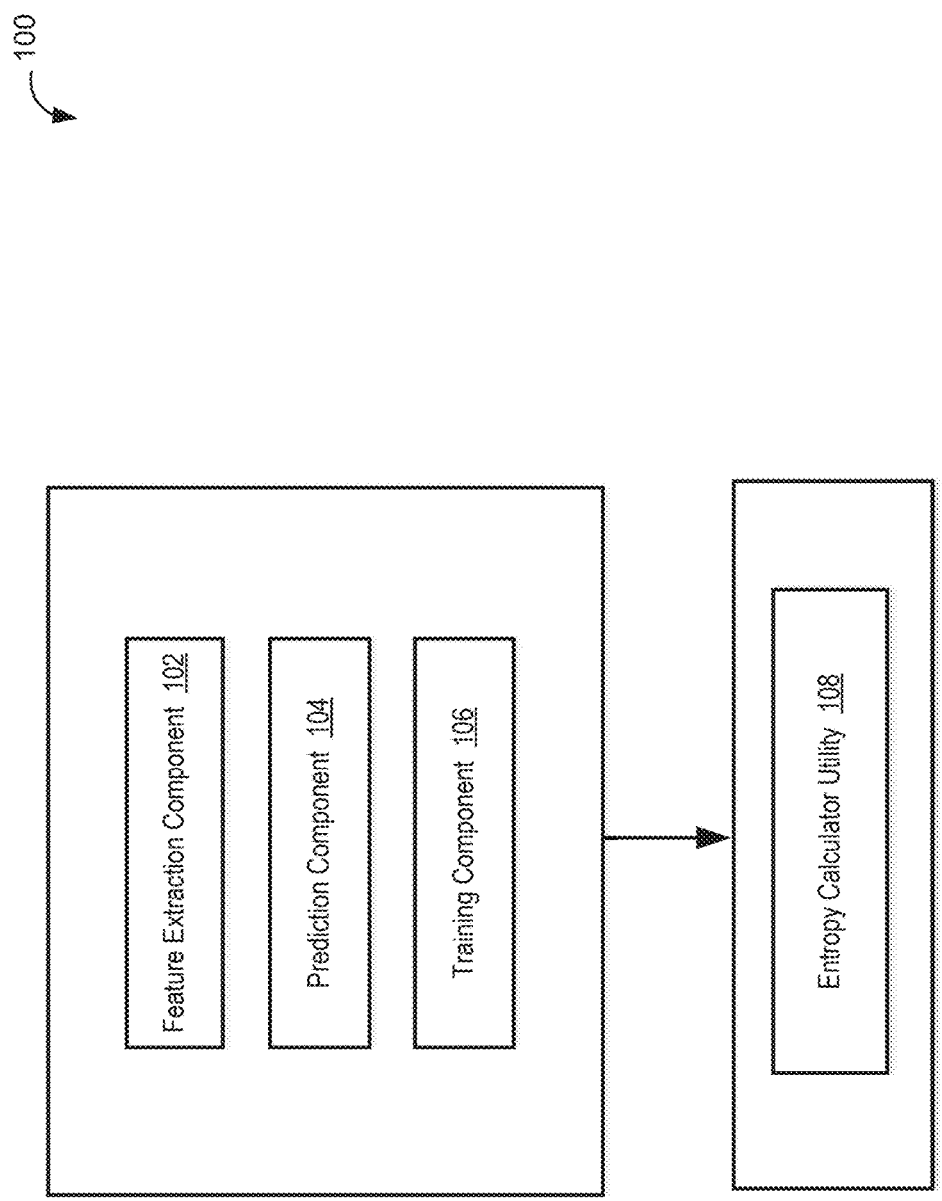
FIG. 1 depicts an exemplary randomness estimation system, according to an implementation of the disclosure.

Described herein are systems and methods for analyzing bit sequences to extract statistical and pattern-based features, which are used to generate a randomness score that quantifies sequence unpredictability for applications such as cryptographic key validation, secure communications, and entropy assessment. The details of some example embodiments of the systems and methods of the present disclosure are set forth in the description below. Other features, objects, and advantages of the disclosure will be apparent to one of skill in the art upon examination of the following description, drawings, examples, and claims. It is intended that all such additional systems, methods, features, and advantages be included within this description, be within the scope of the present disclosure, and be protected by the accompanying claims.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

The present disclosure describes a novel computer-implemented method for estimating randomness in bit sequences by integrating statistical analysis with Convolutional Neural Networks (CNNs). Unlike conventional entropy measurement techniques, which rely solely on statistical models and require large datasets to produce reliable results, the disclosed system and method provides a normalized randomness score ranging from 0 to 1, allowing for efficient evaluation of bit sequence unpredictability. This system is particularly useful for cryptographic key validation, post-quantum security, and randomness assessment in cryptographic applications.

Traditional entropy measurement methods, such as those defined by the National Institute of Standards and Technology (NIST) (e.g., NIST SP 800-90B) or Diehard tests, rely solely on statistical properties of bit sequences and require large input sizes (e.g., 1 million bits) for meaningful results. This makes them impractical for real-world cryptographic applications where key lengths are typically much shorter, such as 256-bit, 1024-bit, or 4096-bit keys. Additionally, NIST-based entropy methods provide scores in a narrow range (e.g., 0.86 to 0.94), limiting their ability to represent the full spectrum of randomness.

Other AI-based entropy assessment methods, such as those utilizing Generative Adversarial Networks (GANs), are restricted to evaluating sequences generated within their own models and cannot be applied to externally produced sequences. This limitation prevents GAN-based methods from being used in cryptographic key strength evaluation or real-time randomness assessment.

The disclosed system introduces several technical improvements that enhance its scalability, adaptability, and efficiency compared to conventional entropy measurement techniques. Unlike traditional methods that rely on fixed statistical models or dedicated hardware-based entropy sources, the proposed system can dynamically analyze new bit sequences without requiring extensive recalibration. The integration of Convolutional Neural Networks (CNNs) with statistical algorithms enables the system to recognize emerging patterns in entropy evaluation, improving accuracy over time. Additionally, the hybrid statistical-AI approach allows the system to handle diverse datasets and entropy sources without retraining the entire model from scratch. This adaptability makes it highly versatile for different applications, such as cryptographic key validation, real-time authentication security, and quantum attack resilience, ensuring minimal computational overhead while maintaining robust and reliable performance. These enhancements allow for a versatile, domain-independent randomness measurement system suitable for cryptographic security, secure communications, and post-quantum computing applications.

FIG. 1 illustrates an exemplary randomness estimation system 100, in accordance with the embodiments disclosed herein. System 100 may include a feature extraction component 102, a prediction component 104, a training component 106, and a randomness calculator utility 108. The system 100 may be configured to receive bit sequences which may be processed by the feature extraction component 102 to compute randomness-related features using statistical analysis and CNN-based pattern recognition. The extracted statistical and CNN-based features by the feature extraction component 102 are used to compute a randomness score by the prediction component 106. The training component 106 may be used to optimize the CNN and prediction model parameters. In FIG. 1, although the system 100 is shown to include components 102, 104, 106 and utility 108, the system 100 may include any number of server and components without limiting the scope of the present disclosure.

The components of system 100 may be communicatively coupled, for example, over a network (not illustrated), which may be a distributed network where the components of system 100 are located at physically different locations (e.g., on different racks, on different enclosures, in different buildings, in different cities, in different countries, and the like) while being connected via the network. In other examples, any combination of the components of system 100 may be co-located, including running as separate virtual devices on the same physical device.

Figure 2:
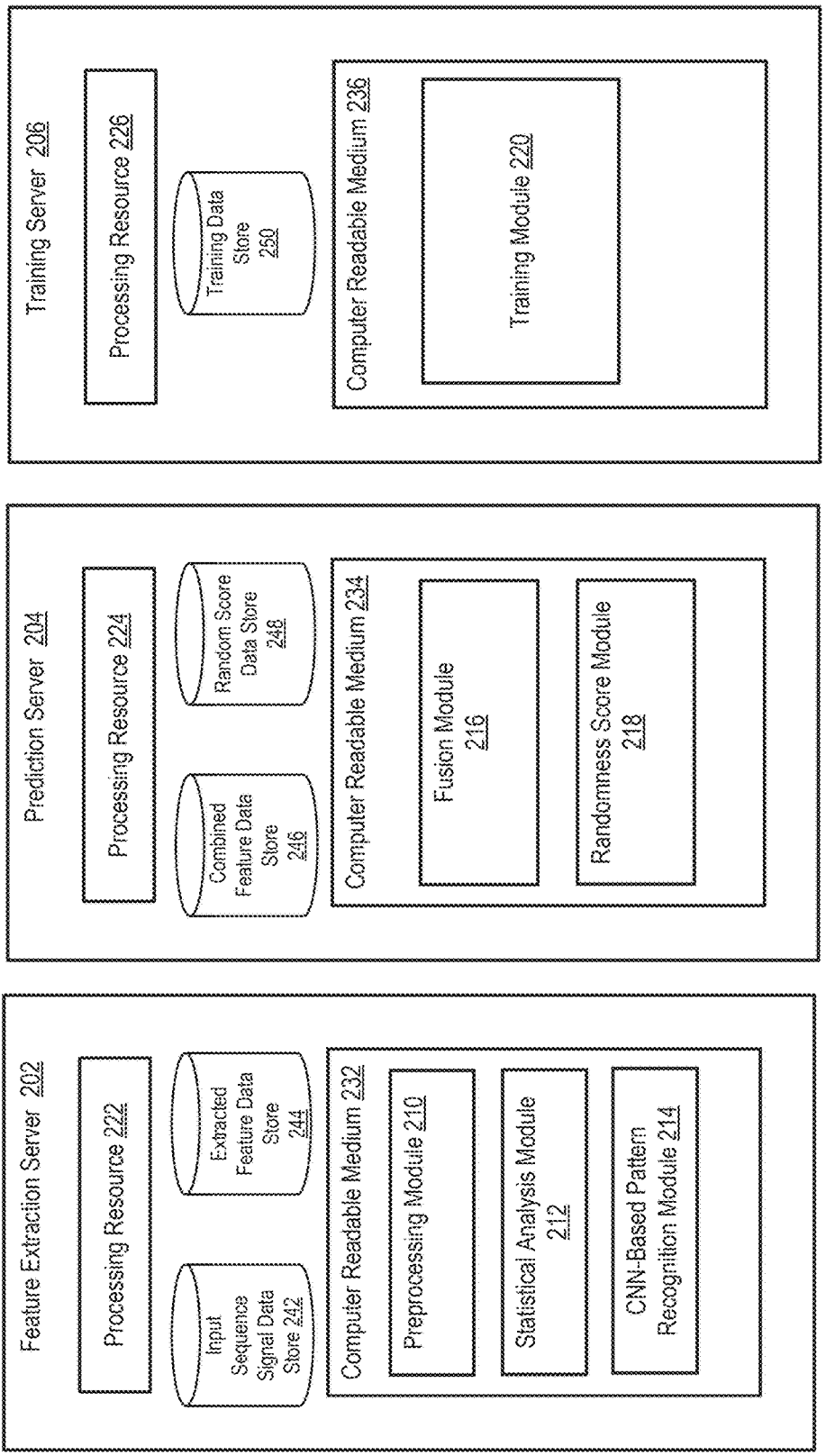
FIG. 2 illustrates detailed architecture of a feature extraction server, a prediction server, and a training server in FIG. 1, according to an implementation of the disclosure.

In the example of FIG. 2, the feature extraction component 102, the prediction component 104, and the training component 106, are maintained on respective servers, specifically a feature extraction server 202, a prediction server 204, and a training server 206, respectively.

As illustrated in FIG. 2, the feature extraction server 202 (i.e., the feature extraction component 102 of FIG. 1) is a heterogeneous computing system including an example processing resource 222 and an example machine-readable medium 232. The processing resource 222 may include different types of processing units (also referred to as service provider resources), such as Central Processing Unit (CPU), Graphical Processing Unit (GPU), and the like. The machine-readable medium 232 includes memory resources (e.g., cache memory), storage resources (e.g., non-volatile storage devices), and the like. The machine readable medium 232 stores a data preprocessing module 210, a statistical analysis module 212, and a CNN-based pattern recognition module 214.

Bit Sequence

The components of data processing server 102 may be configured to receive input sequences which randomness is being evaluated. The input sequence may be stored in an input sequence data store 242. Before it can be processed by the statistical analysis module 212 and the CNN-based pattern recognition module 214 of the randomness estimation system 100, the input sequence must be converted into a bit sequence. A bit sequence is a finite or infinite ordered series of binary digits (bits), where each bit can take one of two values: 0 or 1. Each element in the sequence is a binary digit (bit) that can be either 0 or 1. A bit sequence can have a predefined fixed length (e.g., 256-bit key) or be variable in length depending on the application. Thus, a bit sequence is a raw binary representation of data usually derived from various sources, such as cryptographic keys (e.g., AES, RSA, ECC). Accordingly, the cryptographic key, needs to be converted into a bit sequence before it can be processed by randomness estimation system 100.

Cryptographic keys are typically encoded in different formats. For example, some keys are already in bit sequence format (e.g., raw key material used in cryptographic operations). Some keys (e.g., AES, RSA keys) are stored or represented as hex strings (base-16). Each hex digit must be converted to its 4-bit binary equivalent. Keys used in PEM format (e.g., RSA private keys) are often base64-encoded and must be decoded to binary before randomness evaluation. Finally other cryptographic keys, such as derived keys in password-based encryption are stored as ASCII characters and must be converted to binary. The conversion process ensures that all keys, regardless of their encoding format, are represented as binary sequences (1s and 0s) for processing.

In some embodiments, the preprocessing module 210 may be configured to perform a set of data preprocessing operations with the received input sequence. For example, the preprocessing module 210 may be configured convert the input sequence, such as a cryptographic key, into a bit sequence before it can be processed by the statistical module and the CNN-based pattern recognition module of the randomness estimation system 100. In some embodiments, the preprocessing module 210 may be configured to apply one or more conversion methods to the cryptographic key. For example, the preprocessing module 210 may use hexadecimal-to-binary conversion for keys stored in hex format (e.g., AES, RSA, and ECC keys). In other embodiments, preprocessing module 210 may use base64 decoding for keys stored in PEM format (e.g., RSA and ECC). The data processing operations of the preprocessing module 210 may include data extraction, and binary sequence generation, and any further preparation of data as input for statistical analysis module 212 and CNN-based pattern recognition module 214.

The statistical analysis module 212 may be configured to evaluate bit sequences generated by the preprocessing module 210 using one or more randomness analysis tools. For example, the statistical analysis module 212 may measure bit distribution of a sequence by measuring the ratio of 1s to 0s within the sequence. Similarly, the statistical analysis module 212 may perform run-length analysis which identifies patterns of consecutive 1s and 0s, counting their frequency and distribution.

Further, the statistical analysis module 212 may apply Shannon entropy estimation, computing traditional entropy metrics (in bits) to quantify the unpredictability of a sequence. The module 212 may also perform frequency-based randomness estimation, utilizing standard randomness formulas to analyze probability distributions. Additionally, the statistical analysis module 212 may implement ratio-based evaluations, computing statistics such as the percentage of runs in a sequence to infer randomness properties.

The statistical analysis module 212 extracts randomness-related features from the input bit sequence, including bit frequency distributions, run-length statistics, Shannon entropy, min-entropy, and frequency-based randomness measures. These statistical features provide foundational randomness assessments and are combined with CNN-extracted features to form a joint feature representation, improving the accuracy of the final randomness score.

As alluded to earlier, while effective, statistical methods alone are insufficient for precise randomness estimation particularly in sequences with small sample sizes or complex patterns. To improve accuracy, the extracted statistical features are combined with pattern-based features derived from a Convolutional Neural Network (CNN) as part of the hybrid randomness estimation framework. The statistical features may be stored in an extracted feature data store 244.

The CNN-based pattern recognition module 214 may be configured to enhance entropy measurement by identifying structural patterns in bit sequences. The CNN may be pretrained on a large dataset of known random and non-random sequences. It detects local and global patterns, recognizing areas where sequences deviate from expected randomness. The CNN-based pattern recognition module 214 may be configured to apply multiple convolutional layers with max-pooling and adaptive average pooling to detect local and global structures in the bit sequence.

The CNN-based pattern recognition module 214 may be configured to extract pattern-based features from bit sequences. The extracted pattern-based features may be stored in the extracted feature data store 244.

The CNN-based pattern recognition module 214 extracts multiple feature types to assess the randomness of a bit sequence. These include local pattern structures, such as bit transitions, repetitive sequences, and localized entropy variations, as well as global dependencies, including periodicity, auto-correlation, and fractal structures. By learning patterns that differentiate high-randomness from structured sequences, the CNN enhances the accuracy of the predicted randomness score. Local bit pattern structures may include N-gram distributions which identifies frequently occurring short subsequences (e.g., "111", "101", "000") and their frequencies, repetitive patterns which detect regions with high repetition, which may indicate low randomness, local entropy, which measures how unpredictable subsequences are within a localized window, and bit transitions which counts how often 0s and 1s alternate (e.g., detecting sequences with long runs of 1s or 0s). Global features or long-range dependencies may include periodic structures which identify recurring sequences that indicate non-random periodicity, auto-correlation features which detect whether certain bit patterns reappear at regular intervals, Fourier transform patterns for capturing frequency-domain characteristics of the bit sequence and detecting hidden patterns, and fractal and self-similarity metrics for determining if a sequence exhibits self-repeating structures. Statistical anomalies may include clustered bit distributions that identify regions with unusually high concentrations of 1s or 0s, deviation from uniform randomness by comparing observed bit frequency distributions against expected uniform distributions, localized randomness variations which measures whether some parts of the sequence appear more structured than others. The structural features specific to cryptographic key analysis may include key-dependent irregularities determined by detecting patterns associated with specific cryptographic key generation methods, entropy drops in segments which highlight portions of the sequence that contain lower randomness than others, anomalous bit alignment which flags cases where bits appear too structured based on historical cryptographic randomness distributions.

In some embodiments, the CNN may be trained using labeled datasets containing both highly random and structured bit sequences. For example, the bit sequences labeled with randomness scores may be derived from NIST SP 800-90B, Diehard, and TestU01 tests. Once trained, the CNN is packaged as part of a utility (i.e., entropy calculator utility 108 illustrated in FIG. 1) and does not require continuous retraining. This hybrid approach ensures that the entropy measurement is not limited by sample size constraints and can be applied across bit sequences ranging from hundreds to millions of bits.

In some embodiments, the prediction server 204 (i.e., the prediction component 104 of FIG. 1) may be configured to processes the extracted statistical features by the statistical analysis model 212 and pattern-based features extracted by the CNN-based pattern recognition module 214 of the feature extraction server 202 to compute a randomness score. The prediction server 204 is a heterogeneous computing system including an example processing resource 224 and an example machine-readable medium 234. The processing resource 224 may include different types of processing units (also referred to as service provider resources), such as Central Processing Unit (CPU), Graphical Processing Unit (GPU), and the like. The machine-readable medium 234 includes memory resources (e.g., cache memory), storage resources (e.g., non-volatile storage devices), and the like. The machine readable medium 234 stores a fusion module 216 and a randomness score module 218.

In some embodiments, the fusion module 216 may be configured to combine the statistical and CNN-extracted features using a fusion mechanism including concatenation of feature vectors, weighted sum fusion, or attention-based feature integration.

As alluded to above, traditional statistical methods may miss subtle non-random structures, especially in shorter sequences. CNN-based feature extraction provides deep insight into the hidden structure of bit sequences, enabling a more precise randomness score. By virtue of combining these extracted features with statistical randomness metrics improves the accuracy of the final randomness score (0 to 1).

The fusion algorithm used by the fusion module 216 may be configured to balance both components, generating a combined feature representation used to generate a randomness score ranging from 0 to 1 by the randomness score module 218. The randomness score is derived from a combination of CNN pattern recognition and statistical randomness metrics, with 0 indicating complete structure (low randomness) and 1 representing true randomness.

In some embodiments, the randomness score module 218 may be configured to process the combined feature representation using a fully connected neural network (FCNN) to generate a normalized randomness score between 0 and 1. The randomness score is scaled using a sigmoid or softmax activation function to ensure consistency. The final entropy score may be output as a numeric value between 0 and 1, where 0 represents a fully structured sequence (predictable, low entropy) and 1 represents a truly random sequence (maximum entropy).

In some embodiments, the training server 206 (i.e., the training component 106 of FIG. 1) may be configured to optimize the Convolutional Neural Network (CNN) (used by the CNN-based pattern recognition module 214 of the feature extraction server 202) and the Fully Connected Neural Network (FCNN) (used by the randomness score module 218 of the prediction server 204). The training server 206 is a heterogeneous computing system including an example processing resource 226 and an example machine-readable medium 236. The processing resource 226 may include different types of processing units (also referred to as service provider resources), such as Central Processing Unit (CPU), Graphical Processing Unit (GPU), and the like. The machine-readable medium 236 includes memory resources (e.g., cache memory), storage resources (e.g., non-volatile storage devices), and the like. The machine readable medium 236 stores a training module 220.

The training module 220 may be configured to use a supervised learning approach, where both the Convolutional Neural Network (CNN) and the Fully Connected Neural Network (FCNN) are optimized jointly. The CNN extracts structured and unstructured patterns in bit sequences, while the FCNN processes these extracted features alongside statistical randomness metrics to generate a final randomness score. Both components are trained end-to-end using datasets labeled with randomness scores derived from the standardized randomness tests (e.g., NIST SP 800-90B, Diehard, TestU01, etc.). The training data may be stored in a training data store 250. The CNN is trained to distinguish high-randomness sequences from structured sequences based on labeled randomness scores from standardized randomness tests.

The CNN may be trained to recognize low-randomness patterns that indicate structured (low-randomness) vs. unstructured (high-randomness) data. The training module 220 may be configured to use a supervised learning approach, where both the Convolutional Neural Network (CNN) and the Fully Connected Neural Network (FCNN) are optimized jointly. The CNN extracts structured and unstructured patterns in bit sequences, while the FCNN processes these extracted features alongside statistical randomness metrics to generate a final randomness score. Both components are trained end-to-end using datasets labeled with randomness scores derived from NIST SP 800-90B, Diehard, and TestU01 randomness tests.

The CNN may be trained to recognize low-randomness patterns that indicate structured (low-randomness) vs. unstructured (high-randomness) data. The training data may include bit sequences exhibiting periodicity, clustering, or non-uniform distributions, ensuring that the CNN learns to distinguish predictable structures from random distributions.

The CNN and FCNN models may be optimized using stochastic gradient descent (SGD), Adam, or other adaptive optimization methods to minimize prediction error. Training may involve backpropagation with gradient updates applied to both the CNN feature extraction layers and the FCNN prediction layers, ensuring joint optimization of both networks.

In some embodiments, the system 100 can be integrated into cryptographic security protocols to validate the randomness of cryptographic keys (e.g., RSA, AES keys). For example, the system may reject low-randomness keys and request regeneration. Additionally, the system may be used to enhance blockchain security and post-quantum cryptographic resilience.

In one embodiment, the disclosed system 100 provides a standalone randomness calculator utility 108, which evaluates the randomness of bit sequences using a combination of statistical analysis and deep learning-based pattern recognition. The calculator utility applies trained models, including a Convolutional Neural Network (CNN) and a Fully Connected Neural Network (FCNN), to process input sequences and generate a randomness score ranging from 0 to 1. The randomness score reflects the degree of unpredictability in the sequence, with 0 indicating a fully structured (low-randomness) sequence and 1 representing a highly unpredictable (random) sequence. This utility is valuable for cryptographic key validation, secure communications, and entropy assessment in simulation environments. By leveraging both statistical randomness tests and AI-driven pattern detection, the randomness calculator utility provides a scalable and reliable method for evaluating randomness across different sequence lengths and data sources.

In another embodiments, the randomness estimation system 100 can be integrated into ISO network key management frameworks to ensure cryptographic key compliance in critical infrastructure environments. Many ISO 27001-compliant security systems rely on key management protocols that govern the lifecycle of encryption keys, including generation, distribution, rotation, and revocation. The disclosed system can be incorporated into key management solutions (KMS) to evaluate the entropy of cryptographic keys in real time before they are deployed in sensitive applications.

For example, when a system requests an AES encryption key (128-bit or 256-bit) for securing transactions or authentication, the randomness estimation system can analyze the key's entropy score before allowing its use. If the key fails to meet the required randomness threshold, the system can automatically request key regeneration from a hardware security module (HSM), cloud KMS, or enterprise key management system (EKMS). This ensures that only high-randomness cryptographic keys are issued for secure communications, financial transactions, and industrial control system security. By integrating with ISO-compliant key management protocols, the system enhances security policy enforcement by ensuring that cryptographic keys meet strict entropy requirements before deployment. Additionally, security administrators can configure the system to set minimum entropy thresholds for different security levels, ensuring compliance with industry best practices and quantum-resistant encryption strategies.

In some embodiments, the disclosed randomness estimation system 100 is integrated into Layer 2 encryption protocols within ISO-compliant networks. Many secure networking environments use Layer 2 security mechanisms, such as MACsec (Media Access Control Security) or TLS-based link encryption, to protect data-in-transit between network nodes. The system ensures that encryption keys used at Layer 2 meet high entropy thresholds before they are deployed. If the system detects that a key does not meet sufficient randomness standards, it can automatically request a new key through network-based KMS or HSMs. By incorporating randomness validation directly into Layer 2 key exchange mechanisms, the system enhances network security, ensuring cryptographic keys remain resilient against both classical and quantum-based attacks. This approach provides measurable, real-time security validation, reducing the risk of predictable key generation in mission-critical network environments.

In other embodiments, the randomness estimation system 100 can be integrated into decentralized blockchain key management frameworks, providing entropy validation for private keys used in blockchain networks. Since blockchain-based security relies on strong cryptographic key generation to prevent collisions, replay attacks, and quantum decryption risks, ensuring sufficient randomness in cryptographic keys is crucial for maintaining trustless security models. In some embodiments, the disclosed system 100 can be implemented within hierarchical deterministic wallets. For example, the system 100 can analyze random seed generation used for wallet private key derivation, ensuring high-entropy key derivation paths. In yet other embodiments, the system 100 may be implemented within smart contract security modules. For example, the system can validate randomness quality in cryptographic signing keys, reducing the risk of predictable signatures. Furthermore, the system 100 may be implemented within blockchain-based KMS solutions, such as consensus mechanism. For example, blockchain consensus models such as Proof of Stake (POS) or Delegated Proof of Stake (DPoS) often require random number generation (RNG) for validator selection. The system 100 can evaluate the entropy of the RNG process, ensuring that block validation remains resistant to predictable exploits. Finally, the system 100 may be implemented within quantum-resistant blockchains. For example, post-quantum blockchain architectures may implement the system to validate key randomness and signature generation methods against quantum attacks.

By integrating with blockchain key management systems, the randomness estimation system provides continuous key security validation and prevents weak key distribution, significantly enhancing long-term cryptographic resilience in decentralized environments.

In some embodiments, to enhance adversarial robustness, the randomness estimation system may be trained with adversarially generated bit sequences to prevent attackers from crafting structured sequences that appear random. By training on both naturally occurring and adversarially generated low-randomness sequences, the system improves its ability to detect artificially structured bit patterns designed to evade randomness detection. The randomness estimation process ensures that cryptographic keys meet high randomness thresholds, enhancing resilience against quantum attacks such as Shor's algorithm (used for breaking asymmetric encryption) and Grover's algorithm (used for brute-force attacks on symmetric encryption). By integrating AI-driven pattern recognition with statistical randomness metrics, the system provides an additional security layer for post-quantum cryptographic system.

Figure 3:
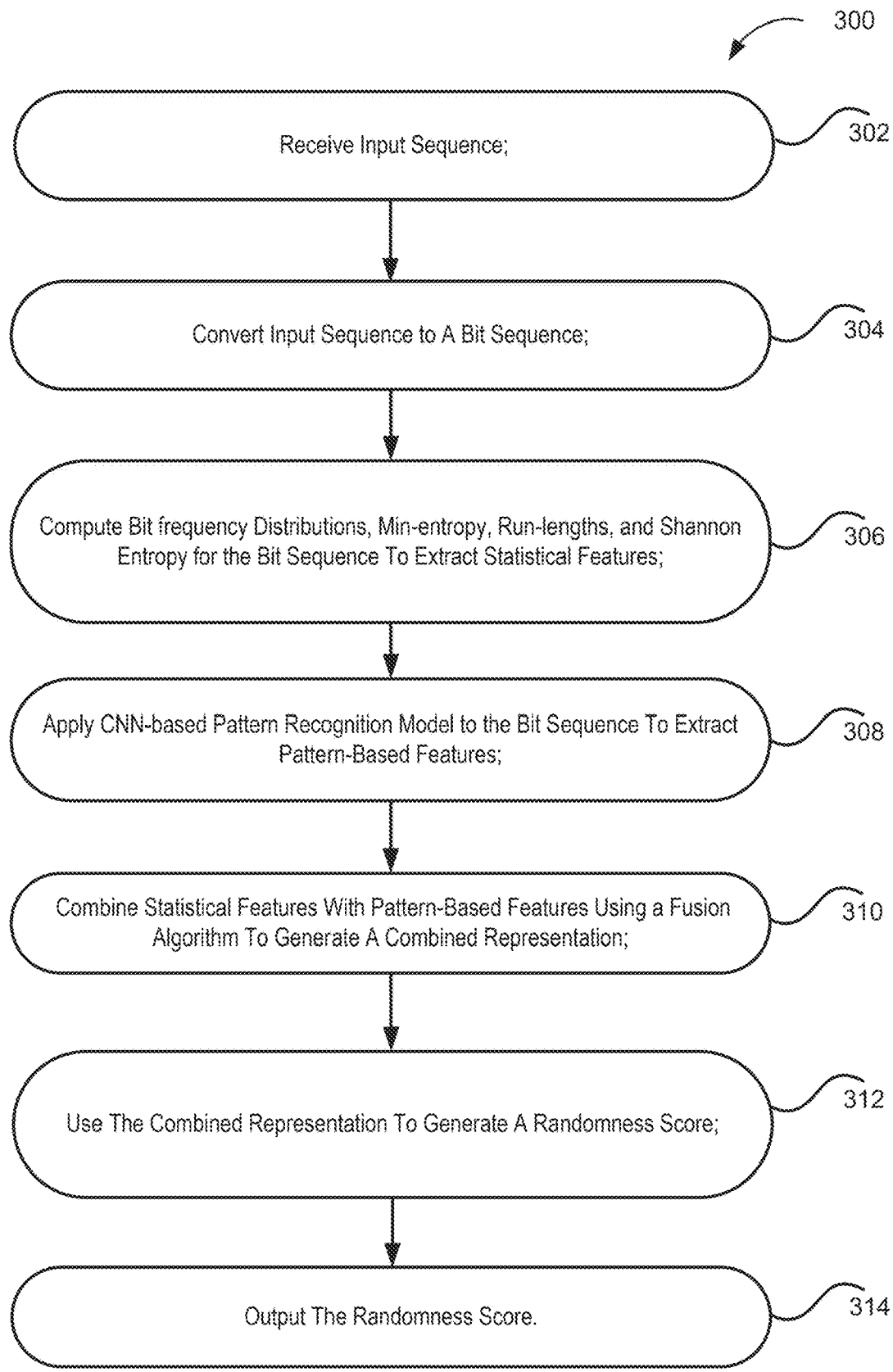
FIG. 3 is a flowchart illustrating a process for randomness score for a bit sequence, according to an implementation of the disclosure.

With reference now to FIG. 3, a flowchart illustrating a process for estimating randomness of an input string is shown in accordance with an illustrative embodiment. The process 300 shown in FIG. 3 may be implemented in a computing component, such as, for example, randomness estimation system 100 illustrated in FIG. 1.

Figure 4:
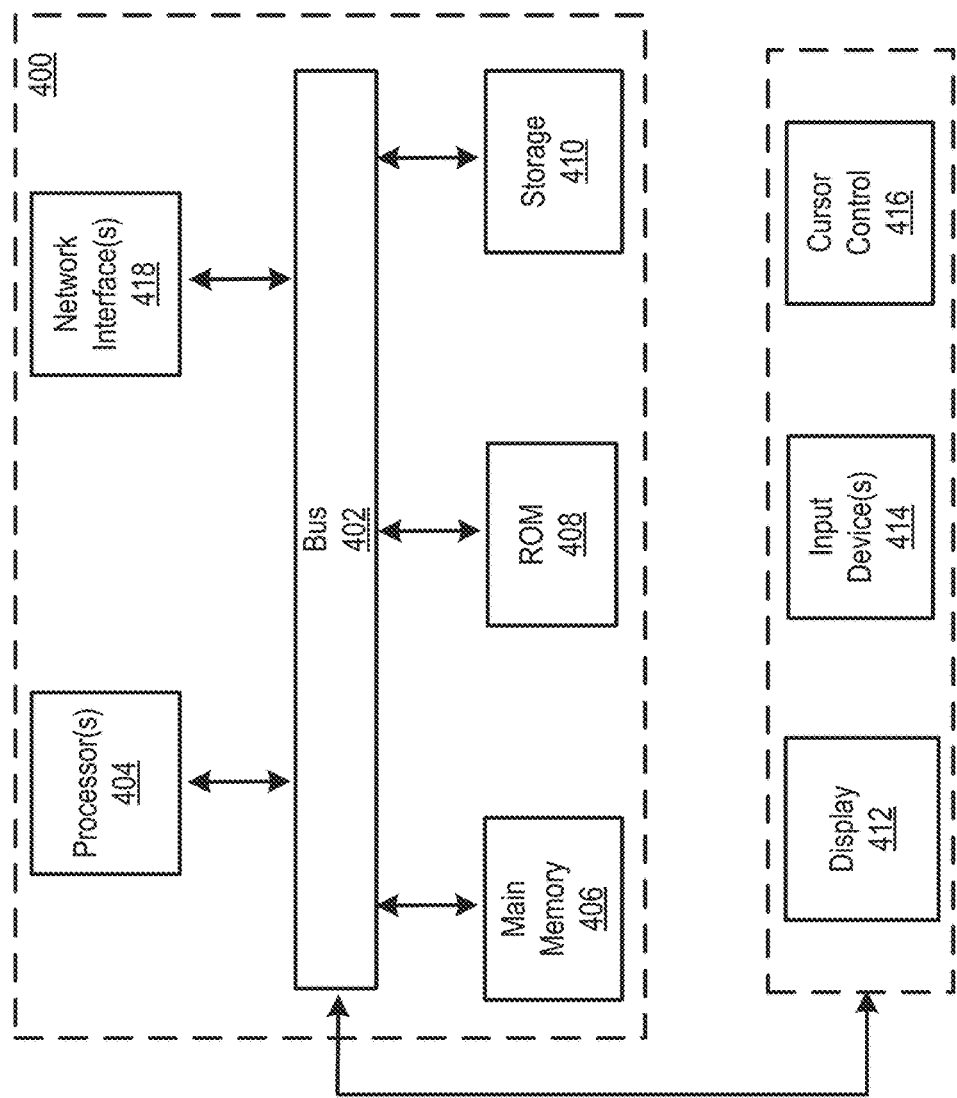
FIG. 4 illustrates an example computing system that may be used in implementing various features of embodiments of the disclosed technology.

The process begins when an input sequence of arbitrary length is provided as input (step 302). The input sequence is converted to a bit sequence (step 304). The system can handle sequences as short as 256 bits and as long as 1 million bits. The system computes bit frequency distributions, min-entropy, run-lengths, and Shannon entropy of the bit sequence (step 306). The system also uses a CNN-based pattern recognition model to processes the bit sequence to detect non-random patterns (step 308). In step 310, the statistical and CNN-based features are combined using a fusion model before randomness estimation. Then, a fully connected neural network (FCNN) takes the fused feature representation and outputs a randomness score (step 312). The randomness score is normalized to a range of 0 to 1. Finally, the randomness score is outputted for interpretation (step 314). For example, if the randomness score falls below a predefined threshold, the system flags the sequence as having low randomness. If used in cryptographic applications, sequences failing the randomness test can be rejected and regenerated to ensure strong cryptographic security.

Where components, logical circuits, or engines of the technology are implemented in whole or in part using software, in one embodiment, these software elements can be implemented to operate with a computing or logical circuit capable of carrying out the functionality described with respect thereto. One such example computing module is shown in FIG. 4. Various embodiments are described in terms of this example computing module 400. After reading this description, it will become apparent to a person skilled in the relevant art how to implement the technology using other logical circuits or architectures.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Referring now to FIG. 4, any suitable computing module or system or group of computing modules or systems can be used for performing the operations described herein. For example, FIG. 4 depicts an example of a computing module 400 that can be used as a feature extraction component 102, a prediction component 104, a training component 106, a randomness entropy calculator utility 108, or various other computing devices performing operations described herein.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally. The bus 402 may also be connected to other components such as a display 412, input devices 414, or cursor control 416 to help facilitate interaction and communications between the processor and/or other components of the computing module 400.

Computing module 400 might also include one or more memory modules, simply referred to herein as main memory 406. For example, preferably random-access memory (RAM) or other dynamic memory might be used for storing information and instructions to be executed by processor 404. Main memory 406 might also be used for storing temporary variables or other intermediate information during execution of instructions to be executed by processor 404. Computing module 400 might likewise include a read only memory ("ROM") 408 or other static storage device 410 coupled to bus 402 for storing static information and instructions for processor 404.

Computing module 400 might also include one or more various forms of information storage devices 410, which might include, for example, a media drive and a storage unit interface. The media drive might include a drive or other mechanism to support fixed or removable storage media. For example, a hard disk drive, a floppy disk drive, a magnetic tape drive, an optical disk drive, a CD or DVD drive (R or RW), or other removable or fixed media drive might be provided. Accordingly, storage media might include, for example, a hard disk, a floppy disk, magnetic tape, cartridge, optical disk, a CD or DVD, or other fixed or removable medium that is read by, written to, or accessed by media drive. As these examples illustrate, the storage media can include a computer usable storage medium having stored therein computer software or data.

In alternative embodiments, information storage devices 410 might include other similar instrumentalities for allowing computer programs or other instructions or data to be loaded into computing module 400. Such instrumentalities might include, for example, a fixed or removable storage unit and a storage unit interface. Examples of such storage units and storage unit interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module 400.

Computing module 400 might also include a communications interface or network interface(s) 418. Communications or network interface(s) interface 418 might be used to allow software and data to be transferred between computing module 400 and external devices. Examples of communications interface or network interface(s) 418 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications or network interface(s) 418 might typically be carried on signals, which can be electronic, electromagnetic (which includes optical) or other signals capable of being exchanged by a given communications interface. These signals might be provided to communications interface 418 via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 406, ROM 408, and storage unit interface 410. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the present application as discussed herein.

Various embodiments have been described with reference to specific exemplary features thereof. It will, however, be evident that various modifications and changes may be made thereto without departing from the broader spirit and scope of the various embodiments as set forth in the appended claims. The specification and figures are, accordingly, to be regarded in an illustrative rather than a restrictive sense.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method for estimating randomness in a bit sequence, the method comprising:
receiving a cryptographic key as input and converting the cryptographic key into a bit sequence;
extracting statistical randomness features from the bit sequence, the statistical features comprising at least bit frequency distributions, run-length statistics, Shannon entropy, and min-entropy analysis;
processing the bit sequence using a convolutional neural network (CNN) to extract pattern-based features;
combining the statistical randomness features and the extracted pattern-based features using a trained fusion network into a joint representation;
generating a normalized randomness score from the combined features using a fully connected neural network (FCNN); and
comparing the randomness score to a predefined entropy threshold;
in response to the randomness score meeting or exceeding the threshold, approving the cryptographic key for use in secure communications, and otherwise triggering a regeneration request to obtain a new key; and
training the CNN and the FCNN parameters using historical bit sequences labeled with known randomness scores.

2. The computer-implemented method of claim 1, wherein the statistical randomness features comprise at least one of frequency counts of bit occurrences, min-entropy analysis based on the most common bit, run-length distributions, and Shannon entropy estimation.

3. The computer-implemented method of claim 1, wherein the CNN comprises multiple convolutional layers configured with at least one of max-pooling operations, adaptive average pooling operations, and residual connections, wherein the CNN is configured to capture hierarchical patterns in the bit sequence.

4. The computer-implemented method of claim 1, wherein the statistical randomness features and pattern-based features are fused using at least one of: a concatenation operation, a weighted sum, a neural network ensemble, or an attention-based feature fusion mechanism.

5. The computer-implemented method of claim 1, wherein the predicted randomness score is normalized using a sigmoid or softmax activation function.

6. The computer-implemented method of claim 5, wherein the predicted randomness score is normalized to a range of 0 to 1.

7. A system for randomness estimation, the system comprising:
one or more physical processors configured by machine-readable instructions to:
receive a cryptographic key as input and convert the cryptographic key into a bit sequence;
extract statistical randomness features from the bit sequence, including one or more of bit frequency distribution, run-length statistics, Shannon entropy, or min-entropy;
process the bit sequence using a convolutional neural network (CNN) to extract pattern-based features;
combine the statistical randomness features and CNN-based features using a trained fusion network;
generate a normalized randomness score from the combined features using a fully connected neural network (FCNN);
compare the randomness score to a predefined entropy threshold;
in response to the randomness score meeting or exceeding the threshold, approve the cryptographic key for use in secure communications, and otherwise trigger a regeneration request to obtain a new key; and
train the CNN and the FCNN parameters using historical bit sequences labeled with known randomness scores.

8. The system of claim 7, wherein the processor is further configured to apply a transformation function to the statistical features before passing them to the FCNN.

9. The system of claim 8, wherein the transformation function is selected from a linear transformation, a logarithmic scaling function, or a non-linear embedding function for improved feature representation.

10. The system of claim 7, wherein the CNN comprises one or more of:
- a custom lightweight architecture optimized for binary pattern recognition,
- a ResNet-based deep learning model, or
- a temporal convolution network (TCN) for sequence-based randomness estimation.

11. The system of claim 7, wherein the historical bit sequences labeled with known randomness scores comprise training data derived from established randomness tests, including NIST SP 800-90B, Diehard, or TestU01.

12. The system of claim 7, wherein the FCNN is trained using supervised learning based on the historical bit sequences labeled with known randomness scores as training data.

13. The system of claim 7, wherein the processor is configured to execute the randomness estimation using at least one of:
- a graphics processing unit (GPU) for parallelized deep learning inference,
- a field-programmable gate array (FPGA) for optimized parallel computing, or
- a dedicated AI inference chip to enhance computational efficiency and reduce latency.

14. The system of claim 7, wherein the processor is further configured to:
- output additional uncertainty estimates related to the randomness score;
- provide anomaly detection feedback, and
- flag input sequences that exhibit adversarial characteristics designed to manipulate randomness estimation.

15. The system of claim 7, wherein the predicted randomness score is further configured to evaluate the strength of cryptographic keys against quantum attacks.

* * * * *